(12) United States Patent
VanderWolk

(10) Patent No.: US 8,528,860 B2
(45) Date of Patent: Sep. 10, 2013

(54) TOOL-LESS TRACK FASTENER

(75) Inventor: Jonathan VanderWolk, Margate, FL (US)

(73) Assignee: BE Aerospace, Inc., Wellington, FL (US)

( * ) Notice: Subject to any disclaimer, the term of this patent is extended or adjusted under 35 U.S.C. 154(b) by 902 days.

(21) Appl. No.: 12/560,715

(22) Filed: Sep. 16, 2009

(65) Prior Publication Data

US 2010/0096502 A1 Apr. 22, 2010

Related U.S. Application Data

(60) Provisional application No. 61/107,420, filed on Oct. 22, 2008, provisional application No. 61/181,334, filed on May 27, 2009.

(51) Int. Cl.
*B60N 2/07* (2006.01)
*B64D 11/06* (2006.01)

(52) U.S. Cl.
USPC ............. 244/118.5; 248/503.1; 296/65.13

(58) Field of Classification Search
USPC ........... 244/118.5, 122 R; 248/429, 503.1; 24/457, 458; 296/65.13, 65.14
IPC ..................................... B64D 11/06; B60N 2/07
See application file for complete search history.

(56) References Cited

U.S. PATENT DOCUMENTS

| | | | | |
|---|---|---|---|---|
| 4,109,891 A | * | 8/1978 | Grendahl | 248/503.1 |
| 4,213,593 A | | 7/1980 | Weik | |
| 4,771,969 A | * | 9/1988 | Dowd | 244/118.6 |
| 4,913,489 A | * | 4/1990 | Martin | 297/232 |
| 5,294,085 A | * | 3/1994 | Lloyd et al. | 248/562 |
| 5,449,132 A | * | 9/1995 | Gilbert | 244/122 R |
| 5,564,654 A | | 10/1996 | Nordstrom | |
| 6,312,037 B1 | | 11/2001 | Garrido et al. | |
| 6,637,712 B1 | * | 10/2003 | Lagerweij | 248/429 |
| 7,334,758 B2 | * | 2/2008 | Williamson et al. | 244/118.6 |
| 7,427,049 B2 | * | 9/2008 | Kennedy et al. | 244/118.6 |
| 7,695,225 B2 | * | 4/2010 | Pozzi | 410/105 |
| 7,785,053 B2 | * | 8/2010 | Hudson | 410/105 |
| 7,857,561 B2 | * | 12/2010 | Mejuhas et al. | 410/105 |
| 7,975,979 B2 | * | 7/2011 | Bishop | 248/429 |

(Continued)

OTHER PUBLICATIONS

International Search Report dated Sep. 13, 2010 for International Patent Application No. PCT/US2009/057278.

*Primary Examiner* — Rob Swiatek
*Assistant Examiner* — Shadi Baniani
(74) *Attorney, Agent, or Firm* — Shumaker, Loop & Kendrick, LLP

(57) ABSTRACT

A tool-less track fastener for anchoring an aircraft seat to a track having spaced-apart access openings and a retaining slot interconnecting the access openings is provided. The track fastener includes a main body for attaching to a leg of an aircraft seat and a track stud positioned at least partially within the main body and having at least one groove circumferentially and an enlarged foot for engaging the retaining slot of the track. At least one locking pin is positioned within the main body to adjustably engage a selected groove of the track stud. A locking bracket is carried about the main body and moveable between a first position wherein the track stud is in an unlocked position and a second position wherein the track stud is locked in the retaining slot by engagement of the at least one locking pin and the selected groove of the track stud.

14 Claims, 16 Drawing Sheets

(56) References Cited

U.S. PATENT DOCUMENTS

| | | | |
|---|---|---|---|
| 2003/0085322 A1* | 5/2003 | Weekly | 244/118.5 |
| 2007/0228215 A1 | 10/2007 | Hudson et al. | |
| 2010/0001546 A1* | 1/2010 | Christensen | 296/65.13 |
| 2010/0025557 A1* | 2/2010 | Ponzo De Siqueira | 248/503.1 |
| 2010/0102610 A1* | 4/2010 | Shao et al. | 297/341 |

* cited by examiner

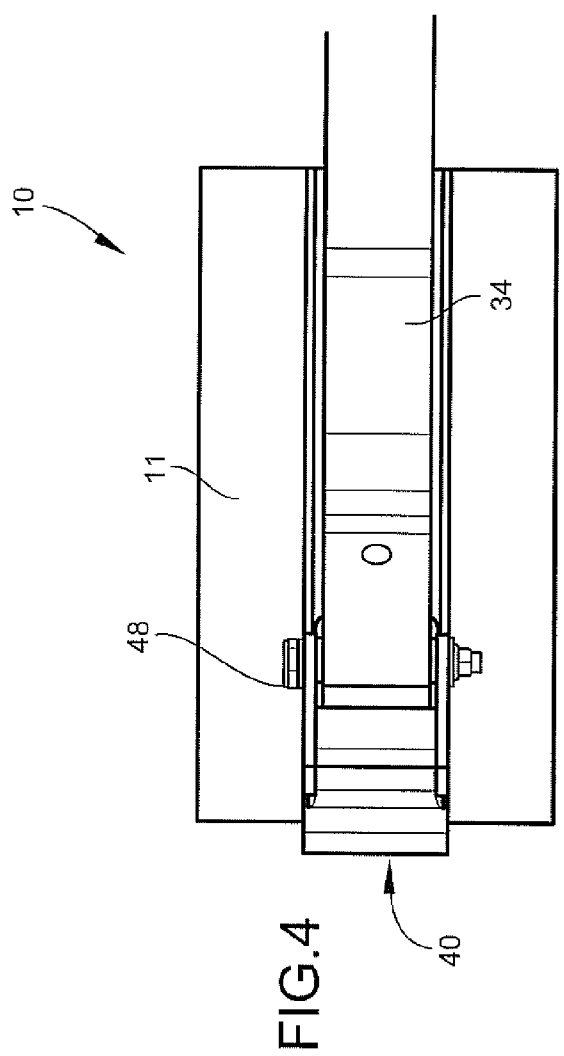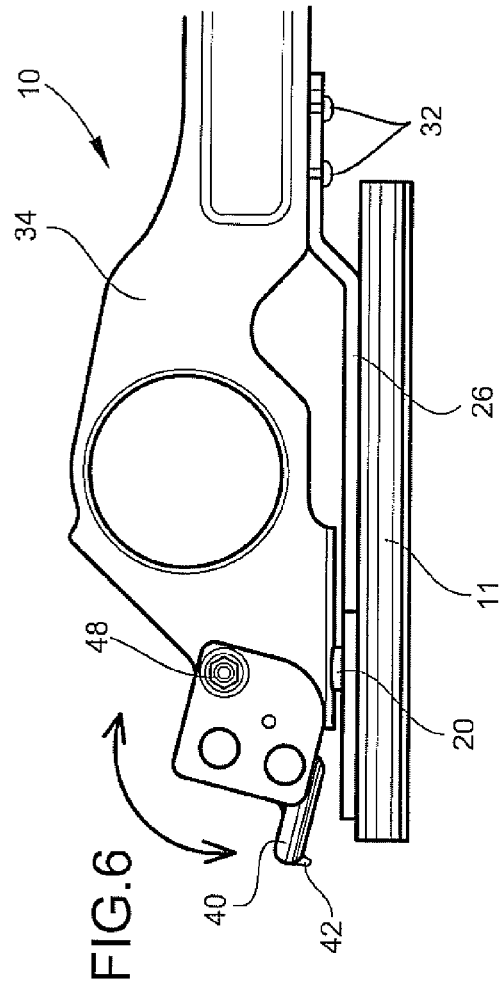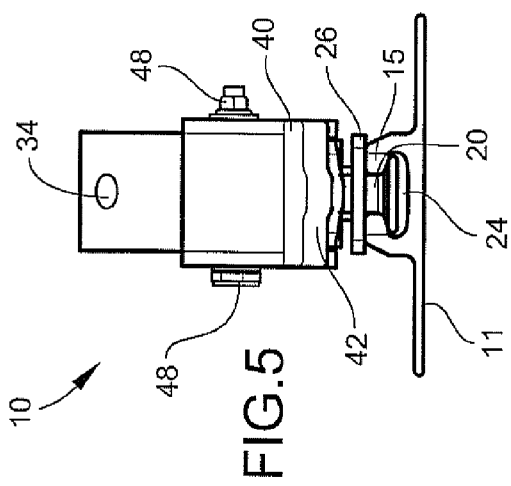

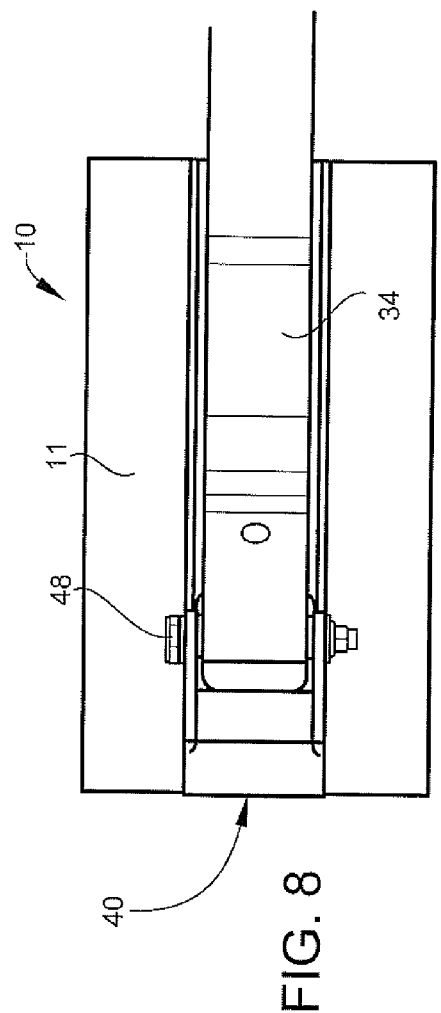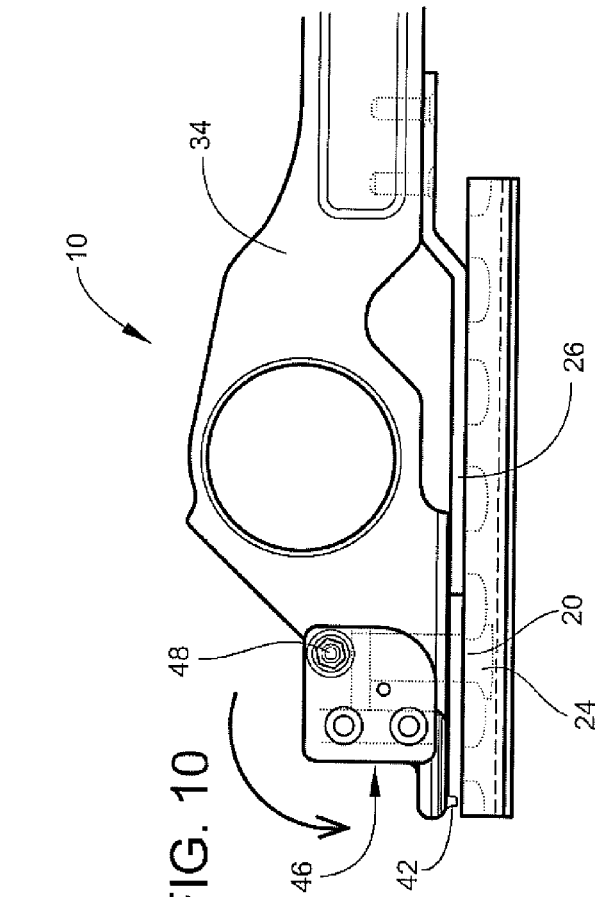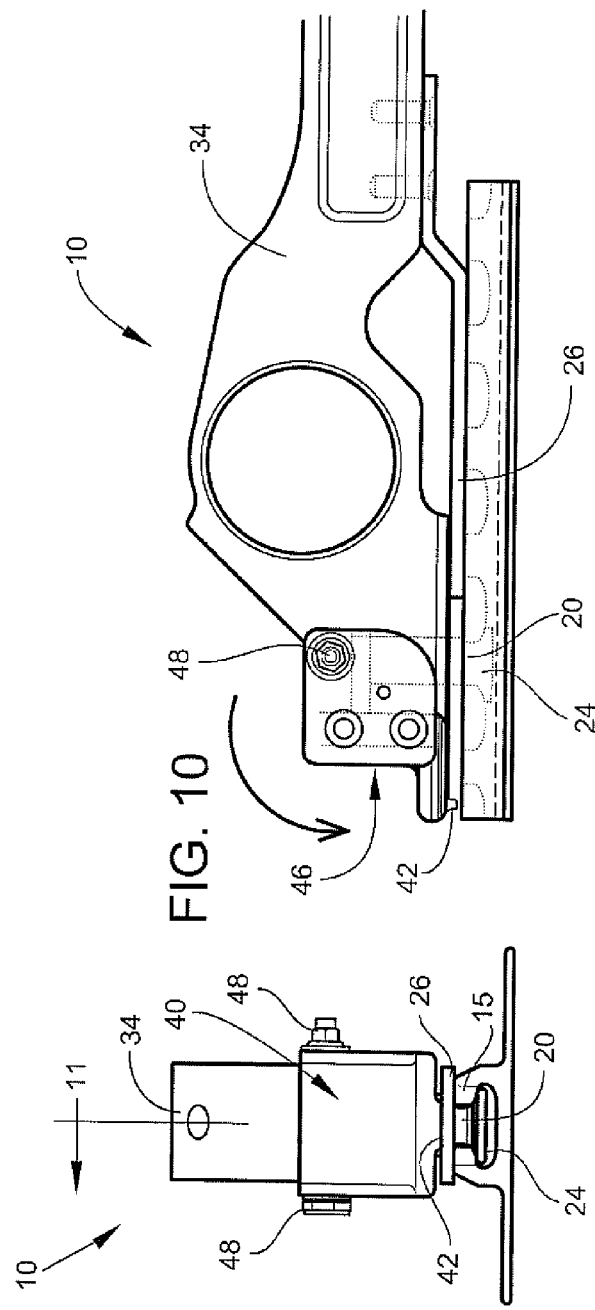

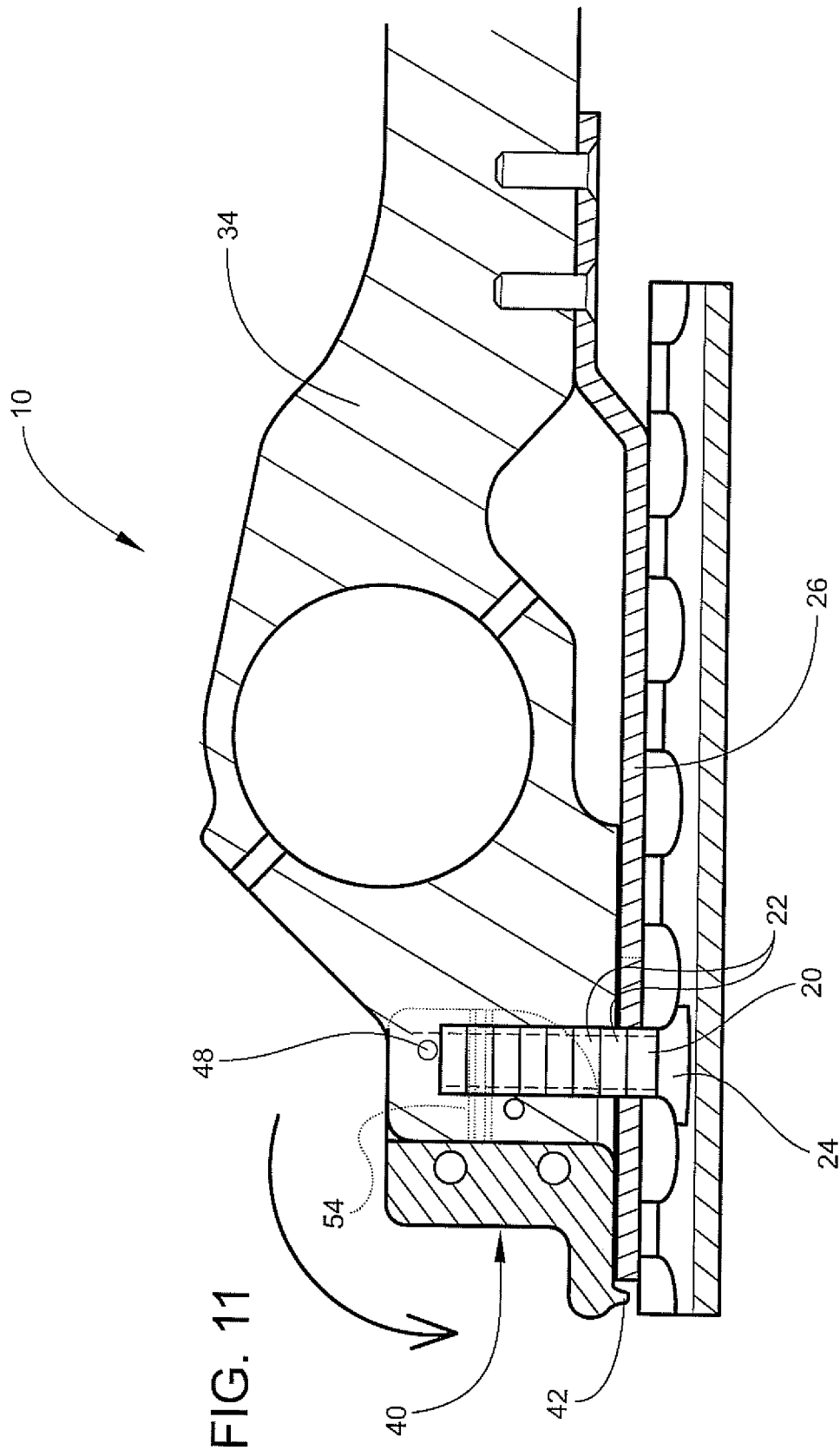

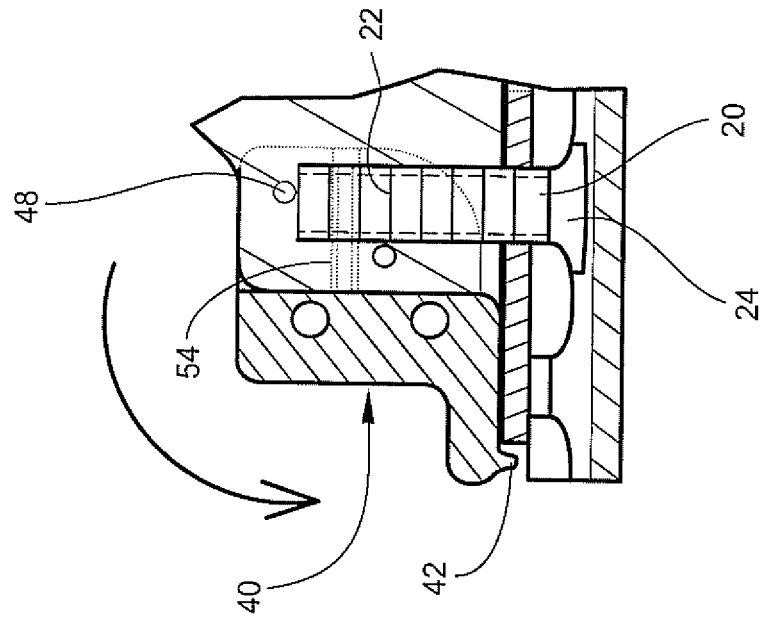
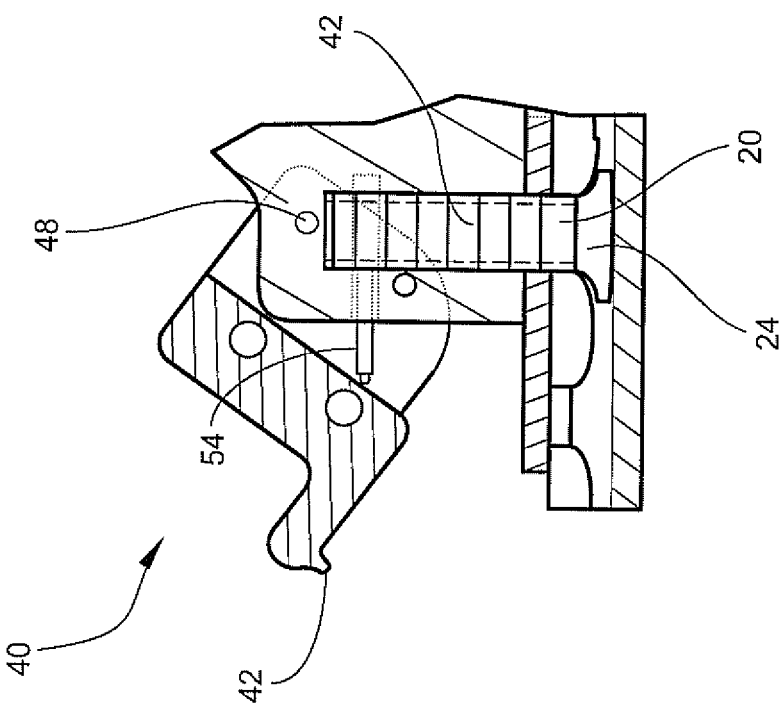

TOOL-LESS TRACK FASTENER

CROSS-REFERENCE TO RELATED APPLICATIONS

This application claims priority to U.S. Provisional Patent Application No. 61/107,420 filed on Oct. 22, 2008, and to U.S. Provisional Patent Application No. 61/181,334 filed on May 27, 2009.

TECHNICAL FIELD AND BACKGROUND OF THE INVENTION

This invention relates to a track fastener assembly of the type used to anchor seats or cargo to tracks fitted to the floor of a vehicle. The particular embodiment disclosed herein is of a track fastener assembly for securing an aircraft passenger seating unit to the floor of an aircraft. Therefore, the vehicle referred to throughout this application is an aircraft. It is understood that the invention relates as well to other types of vehicles such as trains, buses or the like.

Many aircraft require the capability to be differently configured to meet varying cargo and/or passenger-carrying requirements such as the removal or addition of passenger seats and/or cargo. In addition, aircraft also must have the capability to easily and quickly relocate or reposition seats and/or cargo. It is often necessary in aircraft to change the spacing between seats to increase or decrease the passenger density throughout a portion of or the entire aircraft. For example, it may be necessary to change the passenger density of a particular aircraft from its normal first class and coach density to an all-coach configuration such as might be necessary with charter operations. In addition, some aircraft, particularly those operating on late-night schedules, carry both passengers and cargo, the cargo being carried in one or more compartments normally used to carry passengers. Also driving this design is the need of aircraft manufacturers to speed their initial installation time, which is a major consideration on large aircraft with many seats.

To provide this capability, aircraft manufacturers install locking tracks that run fore and aft along the deck of the major compartments of the aircraft. These locking tracks have a slot that runs the entire length of the track along its top side. Enlarged cut-out access openings are spaced at regular intervals along the length of the track to receive track fasteners to permit the track fasteners to be positioned along and locked into the track in order to secure passenger seats and/or cargo pallets that are themselves secured to the track fastener. These track fasteners are adjustable within the track, thereby permitting the seats and/or cargo to be repositioned or removed.

The track fasteners are typically installed with a tool such as an allen wrench or hex head wrench. This process is time consuming and many times difficult to implement. The tool may have to fit within a tightly clearanced area and may work to rotate a threaded fastener, thus requiring tedious rotation of the tool. In other instances, it may be difficult to determine if the track fastener is properly secured in place.

The present invention quickly and efficiently locks the track fastener into its proper position, prevents rattling and vibration that causes irritating noise and may loosen the track fastener, and requires no tools to install into place.

SUMMARY OF THE INVENTION

Therefore, it is an object of the invention to provide a tool-less track fastener assembly for a vehicle such as an aircraft, train, bus or the like.

It is an object of the invention to provide a tool-less track fastener assembly that is quickly and easily locked and unlocked when necessary to reposition the fastener.

It is another object of the invention to provide a tool-less track fastener assembly that is capable of being engaged to a locking track quickly, safely and securely.

It is another object of the invention to provide a tool-less track fastener assembly that does not require special tools.

These and other objects and advantages of the present invention are achieved in the preferred embodiments set forth below by providing a tool-less track fastener for anchoring an aircraft seat to a track having spaced-apart access openings and a retaining slot interconnecting the access openings. The track fastener includes a main body for attaching to a leg of an aircraft seat and a track stud positioned at least partially within the main body and having an enlarged foot formed on an end thereof for engaging the retaining slot of the track. At least one locking member is positioned at least partially within the main body to adjustably engage the track stud and a locking bracket is carried by the main body and adapted to impart movement of the locking member into engagement with the track stud upon movement of the locking bracket between a first position wherein the track stud is in an unlocked position and removable from the track through a selected access opening with which the track stud is aligned to a second position wherein the track stud is locked in the retaining slot between respective access openings by the engagement of the at least one locking member and the track stud.

According to another embodiment, the locking member is a locking pin positioned at least partially within the main body to adjustably engage the track stud.

According to another embodiment, the track stud has a groove circumferentially formed thereon and adapted for being engaged by the locking pin.

According to another preferred embodiment, a tool-less track fastener for anchoring an aircraft seat to a track having spaced-apart access openings and a retaining slot interconnecting the access openings is provided. The track fastener includes a main body for attaching to a leg of an aircraft seat and a track stud positioned at least partially within the main body and having at least one groove circumferentially formed thereon and an enlarged foot formed on an end thereof for engaging the retaining slot of the track. At least one locking pin is positioned at least partially within the main body to adjustably engage a selected groove of the at least one groove of the track stud and a locking bracket is carried by the main body and adapted to impart movement of the locking pin into engagement with the selected groove of the track stud upon movement of the locking bracket between a first position wherein the track stud is in an unlocked position and removable from the track through a selected access opening with which the track stud is aligned to a second position wherein the track stud is locked in the retaining slot between respective access openings by the engagement of the at least one locking pin and the selected groove of the track stud.

According to another embodiment, the bracket is rotatably mounted on the main body.

According to another embodiment, the at least one locking pin comprises a pair of spaced-apart locking pins that are oriented generally parallel with the at least one groove of the track stud.

According to another embodiment, the track stud is slideably positioned within the main body.

According to another embodiment, the track stud further includes a base plate positioned between the main body and the track when the seat is in an installed position for resting against and providing support against the track.

According to another preferred embodiment, an aircraft seat is provided and includes a seat bottom and seat back, a leg attached to the seat bottom, and a tool-less track fastener for anchoring the leg to a track having spaced-apart access openings and a retaining slot interconnecting the access openings. The tool-less track fastener includes a main body for attaching to the leg of the aircraft seat and a track stud positioned at least partially within the main body and having at least one groove circumferentially formed thereon and an enlarged foot formed on an end thereof for engaging the retaining slot of the track. At least one locking pin is positioned at least partially within the main body to adjustably engage a selected one of the at least one groove of the track stud and a locking bracket is carried about the main body and moveable between a first position wherein the track stud is in an unlocked position and removable from the track through a selected access opening with which the track stud is aligned and a second position wherein the track stud is locked in the retaining slot between respective access openings by engagement of the at least one locking pin and the selected one of the at least one groove of the track stud.

According to another embodiment, the locking bracket is rotatably mounted on the main body.

According to another embodiment, the at least one locking pin comprises a pair of spaced-apart locking pins that are oriented generally parallel with the at least one groove.

According to another embodiment, the track stud is slideably positioned within the main body.

According to another embodiment, the track fastener further includes a base plate positioned between the main body and the track when the seat is in an installed position for resting against and providing support against the track.

According to another preferred embodiment, a tool-less track fastener for anchoring an aircraft seat to a track having spaced-apart access openings and a retaining slot interconnecting the access openings is provided. The track fastener includes a main body for attaching to a leg of an aircraft seat and a lock disk positioned in proximity to the main body and configured to engage with a selected one of the access openings. A push rod is positioned at least partially within the main body and adapted to impart movement of the lock disk and a locking bracket is carried by the main body and in engagement with the push rod and moveable between a first position in which the lock disk is free of interference with the selected one of the access openings and a second position in which the push rod imparts movement of the lock disk into engagement with the selected one of the access openings.

According to another embodiment, the track fastener further includes a pad positioned on a bottom surface of the main body.

According to another embodiment, the track fastener further includes at least one track stud positioned at least partially within the main body for being inserted through a respective access opening when the locking bracket is in the first position and for engaging the retaining slot when the locking bracket is in the second position.

According to another embodiment, the track fastener further includes a biasing spring positioned on a reduced circumference area of the push rod for biasing the push rod away from the lock disk.

According to another embodiment, the lock disk comprises at least one shoulder formed on opposing ends of the lock disk, and the at least one shoulder has a generally arcuate cross section that conforms to the shape of a portion of an access opening.

According to another embodiment, the main body defines an opening that receives a spherical bushing, and the spherical bushing defines an opening for receiving a fastener that fastens the main body to an aircraft seat.

According to another embodiment, the locking bracket defines a cavity therein that receives the push rod.

According to another embodiment, the push rod is attached to the lock disk by a selectively releasable fastener.

According to another embodiment, the push rod is attached to the lock disk by peening a surface of the push rod into engagement with the lock disk.

According to another preferred embodiment, an aircraft seat is provided. The aircraft seat includes a seat back, a seat bottom, a leg attached to a track having spaced-apart access openings and a retaining slot interconnecting the access openings, and a tool-less track fastener for attaching the leg to the track. The tool-less track fastener includes a main body for attaching to a leg of an aircraft seat and a lock disk positioned in proximity to the main body and having at least one locking shoulder configured to engage with a selected one of the access openings. A push rod is positioned at least partially within the main body and in proximity to the lock disk for imparting movement to the lock disk and a locking bracket is mounted about the main body and in selective engagement with the push rod and moveable between a first position in which the shoulders of the lock disk are free of interference with the selected one of the access openings and a second position in which the push rod imparts movement to the lock disk until the shoulders of the lock disk engage the selected one of the access openings.

According to another embodiment, the track fastener further includes a pad positioned on a bottom surface of the main body.

According to another embodiment, the track fastener further includes at least one track stud positioned at least partially within the main body for being inserted through a respective access opening when the locking bracket is in the first position and for engaging the retaining slot when the locking bracket is in the second position.

According to another embodiment, the track fastener further includes a biasing spring positioned on a reduced circumference area of the push rod for biasing the push rod away from the lock disk.

According to another embodiment, the lock disk comprises at least one shoulder formed on opposing ends of the lock disk, and the at least one shoulder has a generally arcuate cross section that conforms to the shape of a portion of an access opening.

According to another embodiment, the main body defines an opening that receives a spherical bushing, and the spherical bushing defines an opening for receiving a fastener that fastens the main body to the aircraft seat.

According to another embodiment, the locking bracket defines a cavity therein that receives the push rod.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 4 is an overhead view of the track fastener and adjacent length of the locking track, showing the track fastener in an unlocked position;

FIG. 5 is a front view of the track fastener and adjacent length of the locking track, showing the track fastener in an unlocked position;

FIG. 6 is a side view of the track fastener and adjacent length of the locking track, showing the track fastener in an unlocked position;

FIG. 8 is an overhead view of the track fastener and adjacent length of the locking track, showing the track fastener in an locked position;

FIG. 9 is a front view of the track fastener and adjacent length of the locking track, showing the track fastener in an locked position;

FIG. 10 is a side view of the track fastener and adjacent length of the locking track, showing the track fastener in an locked position;

FIG. 11 is a cross sectional side view of the track fastener and adjacent length of the locking track, showing the track fastener in a locked position;

FIG. 12a is a cross sectional side view of the track fastener and adjacent length of the locking track, showing the track fastener in an unlocked position;

FIG. 12b is a cross sectional side view of the track fastener and adjacent length of the locking track, showing the track fastener in a locked position;

FIG. 16b is an enlarged partial view of the track fastener of FIG. 5a;

FIG. 24b is an enlarged partial view of the track fastener of FIG. 24a.

TECHNICAL FIELD AND BACKGROUND OF THE INVENTION

Figure 1:
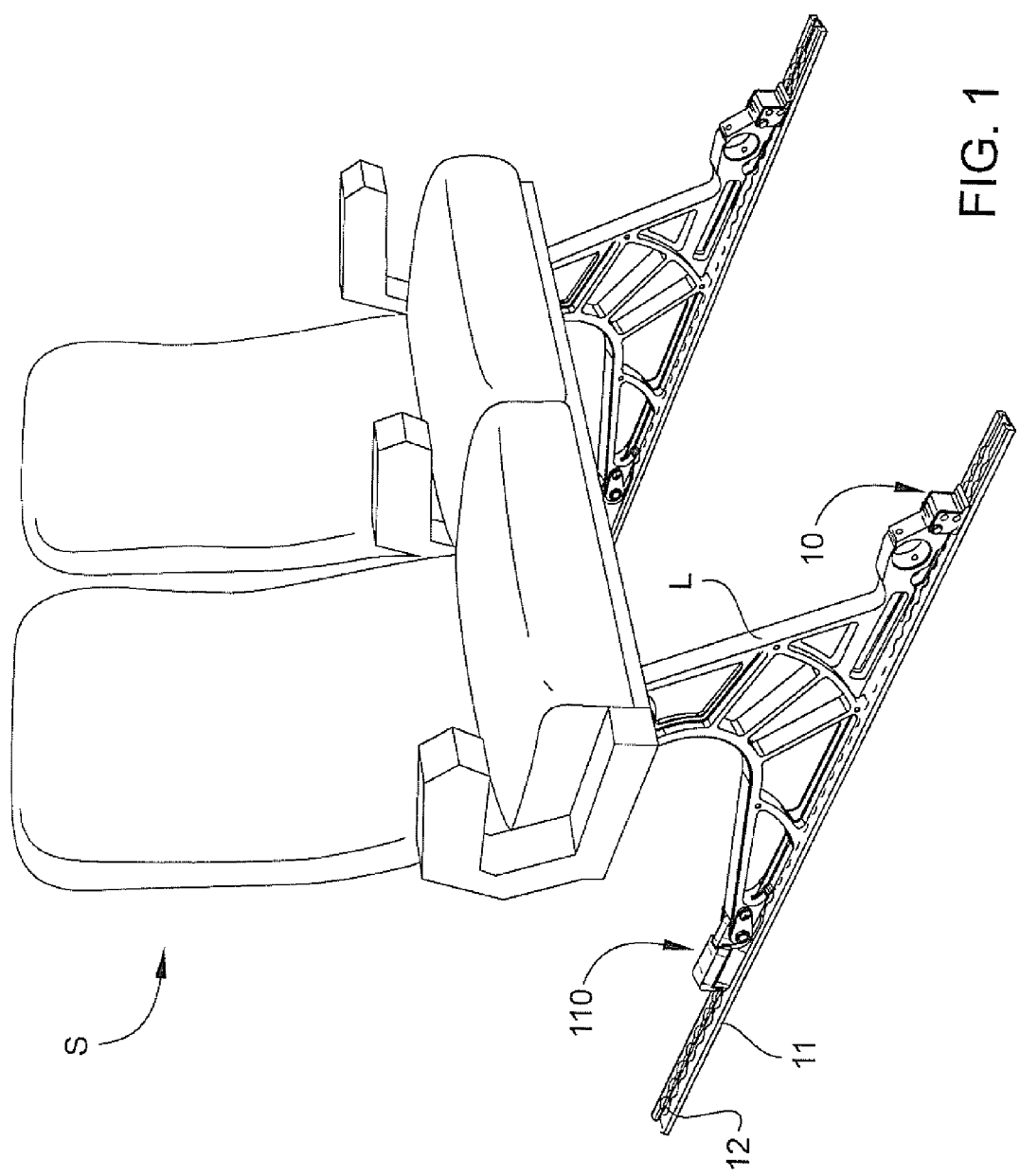
FIG. 1 is a perspective view of an aircraft passenger seat and locking track incorporating a tool-less track fastener.

Referring now specifically to the drawings wherein identical reference numerals denote the same elements within and among the various views, a typical seating arrangement using the track fastener assembly according to the present invention is illustrated in FIG. 1. A seating unit "S" is positioned on a locking track 11 and locked thereto by means of track fastener assemblies 10 and 110 mounted on the front and rear end of the seat legs "L."

Figure 2:
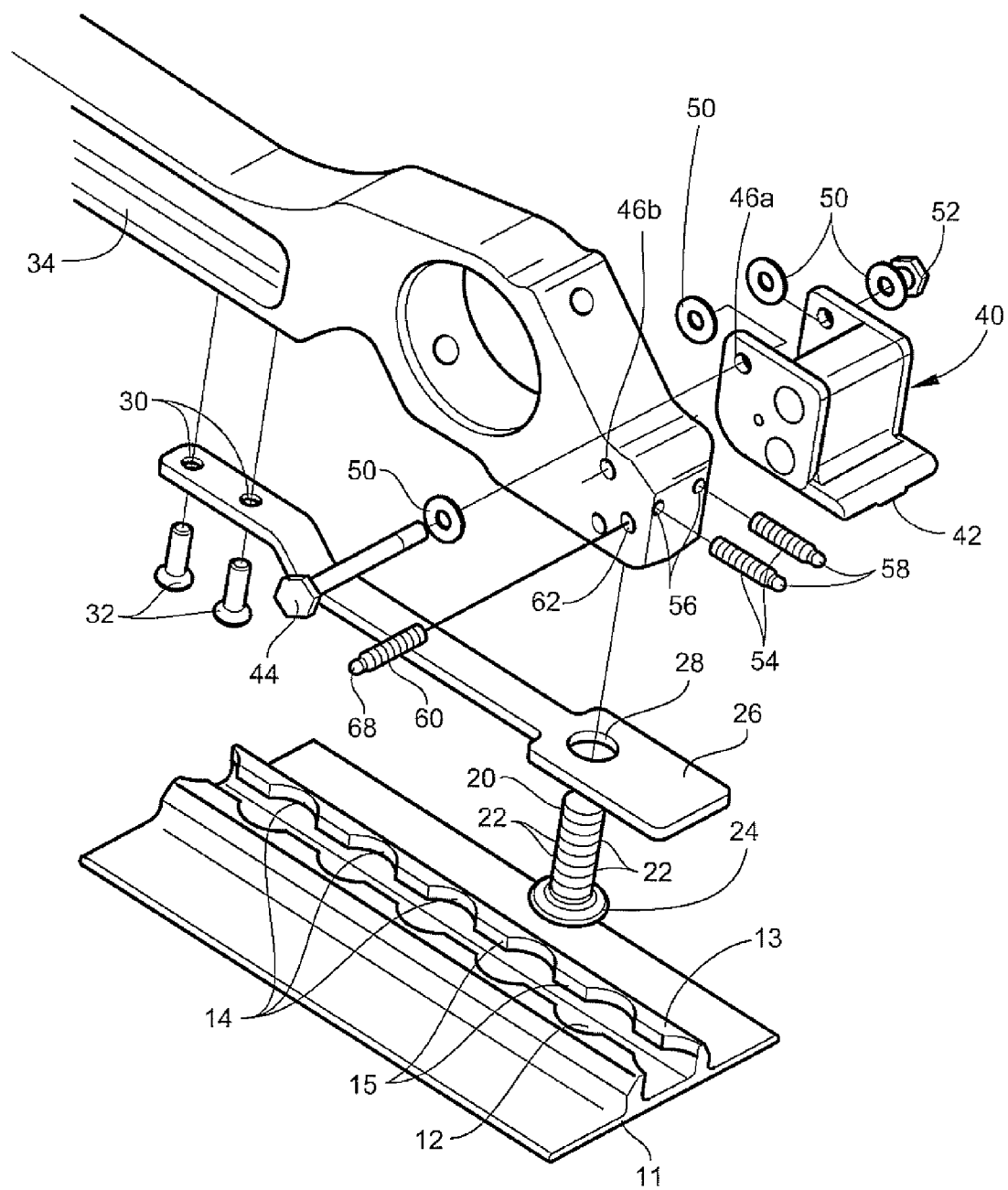
FIG. 2 is a perspective view of the track fastener and adjacent length of the locking track in an exploded view.

Referring now to FIG. 2, locking track 11 has a longitudinally-extending slot 12 therein that extends along the entire length of the locking track 11. Upper walls 13 of the locking track 11 define the slot 12 and have regularly spaced-apart enlarged access openings 14 along the length thereof, separated by relatively narrower track slot segments 15 forming a retaining slot that interconnects the access openings 14 and actually performs the locking function. In FIG. 2 it is evident that the narrow track slot segments 15 extend into the slot 12 to provide undercut areas in the slot 12 beneath the slot segments 15. In contrast, the enlarged access openings 14 have little or no undercut areas in the slot 12. The locking track 11 is attached to the floor of the aircraft, for example by machine screws that pass through screw holes, not shown, in the bottom of locking track 11.

The tool-less track fastener assembly 10 is shown in an exploded view in FIG. 2. The tool-less track fastener assembly 10 generally includes a base plate 26 defining an opening 28 for receiving a track stud 20. A plurality of fasteners 32 secure the base plate 26 to the main plate 34 through a corresponding plurality of apertures 30. The fasteners 32 can be bolts, screws, rivets, wedges, or any equivalent structure. A portion of the base plate 26 rests in contact with the track assembly 11 when the tool-less track fastener assembly 10 is in the locked position.

Track stud 20 includes an enlarged locking foot 24 configured to lock within the track assembly 11. The locking foot 24 includes a peripherally extending flange for contacting the narrow track segments 15. Locking foot 24 is operable to cause a mechanical contact against narrow track segments 15 and maintain the track fastener 10 in place. Track stud 20 includes a plurality of arcuate grooves 22 for receiving a pair of locking pins 54. Each groove 22 is sized such that each locking pin 54 will fit within a selected groove 22 and lock the track stud 20 into place. The locking pins 54 are configured to engage a complementary pair of recesses 56 formed within the main plate 34 of the tool-less track fastener assembly 10. Locking pins 54 each include a rounded detent head 58 that is configured to fit within a corresponding recess of a locking bracket 40 in order to lock bracket 40 in place.

Another locking pin 60 is provided on an elongate side of the tool-less track fastener assembly 10. The locking pin 60 is also configured to engage a complementary opening 62 formed within the main plate 34 of the tool-less track fastener assembly 10. A matching and corresponding locking pin may be provided on an opposing side from locking pin 60. Similar to locking pins 54, locking pin 60 includes a rounded detent head 68 for fitting within a corresponding recess 63 of the locking bracket 40.

Locking bracket 40 is provided for locking the track stud 20 in the locked position. The locking bracket 40 includes a tab 42 configured to fit within slot 12 and may be utilized for providing a contact point for rotating the locking bracket 40. The locking bracket 40 is hinged about a hinged joint 48 formed from a fastener 44 inserted through a complementary opening 46a of the locking bracket and 46b of the main plate 34. Fastener 44 is secured by a lock nut 52 positioned on an opposing side of the locking bracket 40 and is further secured by a plurality of washers 50 held by the fastener 44 on either of opposing sides of the locking bracket 40.

Figure 3:
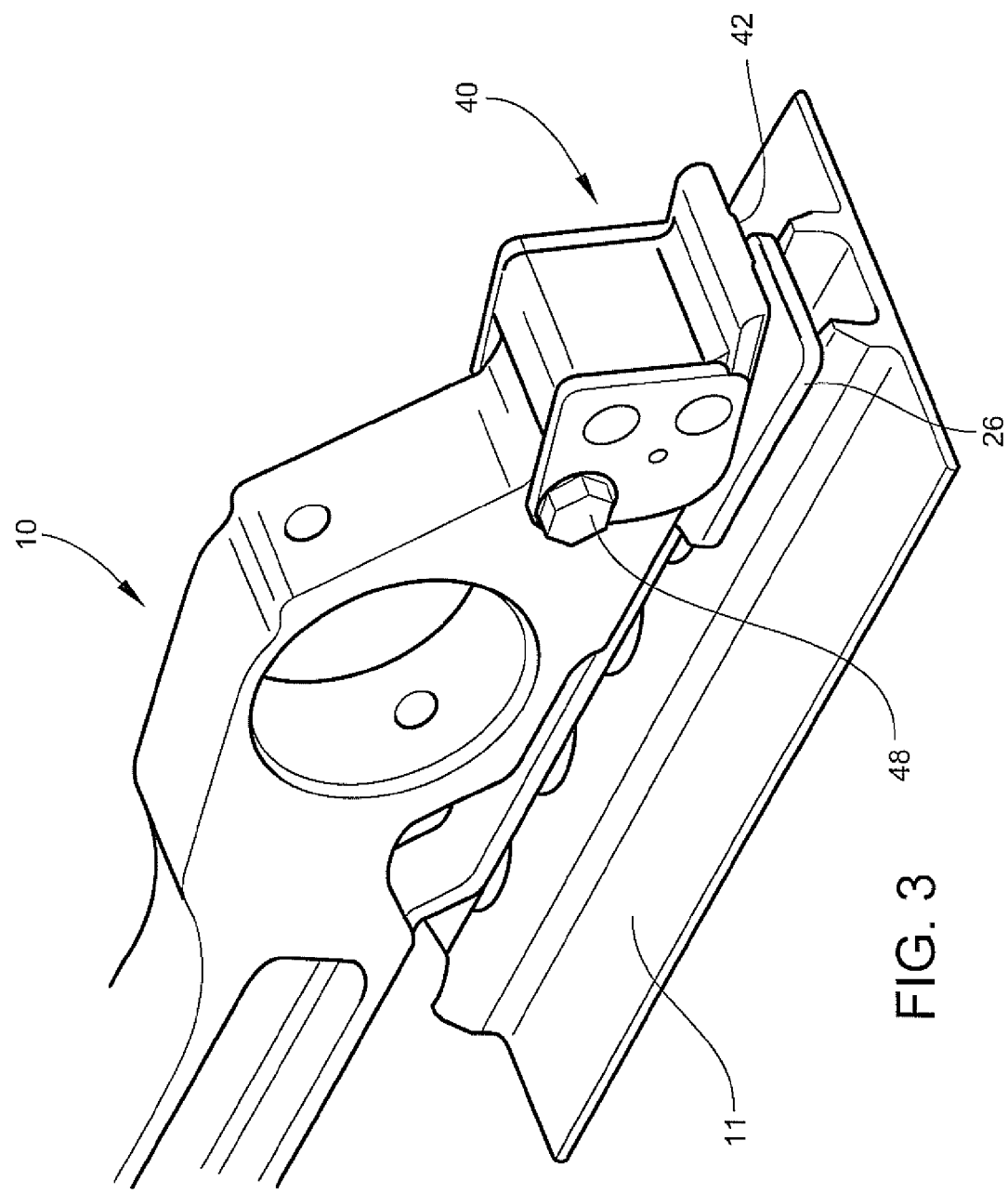
FIG. 3 is a perspective view of the leg of the tool-less track fastener and adjacent length of the locking track, showing the track fastener in an unlocked position.
Figure 7:
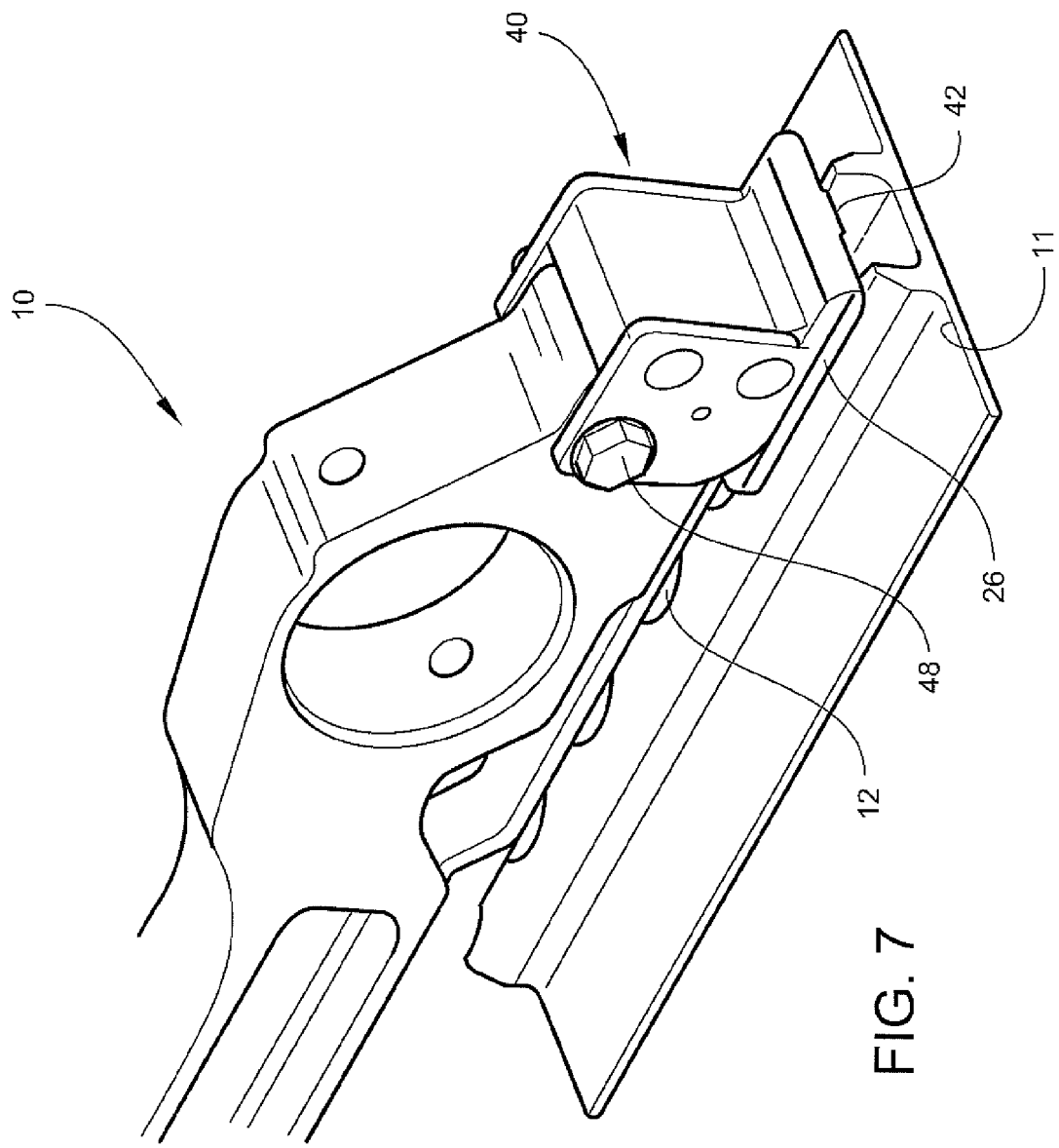
FIG. 7 is a perspective of the leg of the tool-less track fastener and adjacent length of the locking track, showing the track fastener in an locked position.

As shown in FIG. 3, the locking bracket 40 is configured for rotational movement about the hinged joint 48. The rotational movement of the locking bracket 40 enables locking of the track stud 20 within the track assembly 11 as is discussed in greater detail in subsequent paragraphs of this application. In some embodiments, the locking bracket 40 will include a biasing element such as a torsional spring positioned coaxially with the hinged joint 48, or a coil spring positioned within the travel path of the hinged joint 48 upon rotation. This biasing element will act to maintain the locking bracket 40 within a preferred orientation, whether that orientation is the locking bracket 40 being in a close or an open position. The locking bracket 40 will preferably have two positions, a first unlocked position as shown in FIGS. 3-6 and FIG. 12a and a second locked position as shown in FIGS. 7-11 and FIG. 12b.

When the locking bracket 40 is in the closed position, locking pins 54 are pressed into the recesses 56 of the main plate 34. When the locking bracket 40 is in the closed position, the locking pins 54 are depressed into the recesses 56 such that the locking pins 54 contact a selected arcuate groove of the plurality of arcuate grooves 22 found extending vertically on the track stud 20. This contact between the locking pins 54 and the selected arcuate groove 22 acts to hold the track stud 20 in place or restricting vertical movement of the track stud 20. It shall be appreciated that the detent heads 58 of the locking pins 54 fit within the corresponding recess formed in the locking bracket 40 such that the detent heads 58 act to lock the locking bracket 40 into place when in the closed position. The detent heads 68 of the locking pin 60 perform the same function. It should be apparent that when the locking bracket 40 is in the closed position, the track stud 20 is locked into place and secures the tool-less track fastener assembly 10 into the track assembly 11.

The tool-less track fastener assembly 10 is shown in FIGS. 11, 12a, and 12b in a cross sectional view. Locking pins 54 are engaged with a groove 22 of the track stud 20 such that the track stud 20 is maintained in place. The track stud 20 may be a plunger type mechanism and include some linking member to maintain the track stud 20 within the tool-less track fastener assembly 10. When the locking bracket 40 is rotated counter-clockwise as shown in FIG. 12a, locking pins 54 are biased out of the main plate 34 allowing the track stud to drop a depth sufficient for sliding the tool-less track fastener assembly 10 within the track fitting 11. The seat "S" is then slid fore or aft so that track stud 20 is located within narrow segments 15. The locking bracket 40 is then rotated clockwise to the closed position, and the locking pins 56 contact the grooves 22 of the tracks stud 20, holding the track stud 20 upwards so as to cause a mechanical contact with the track segments 15 and restrict movement of the tool-less track fastener assembly 10.

Figure 13:
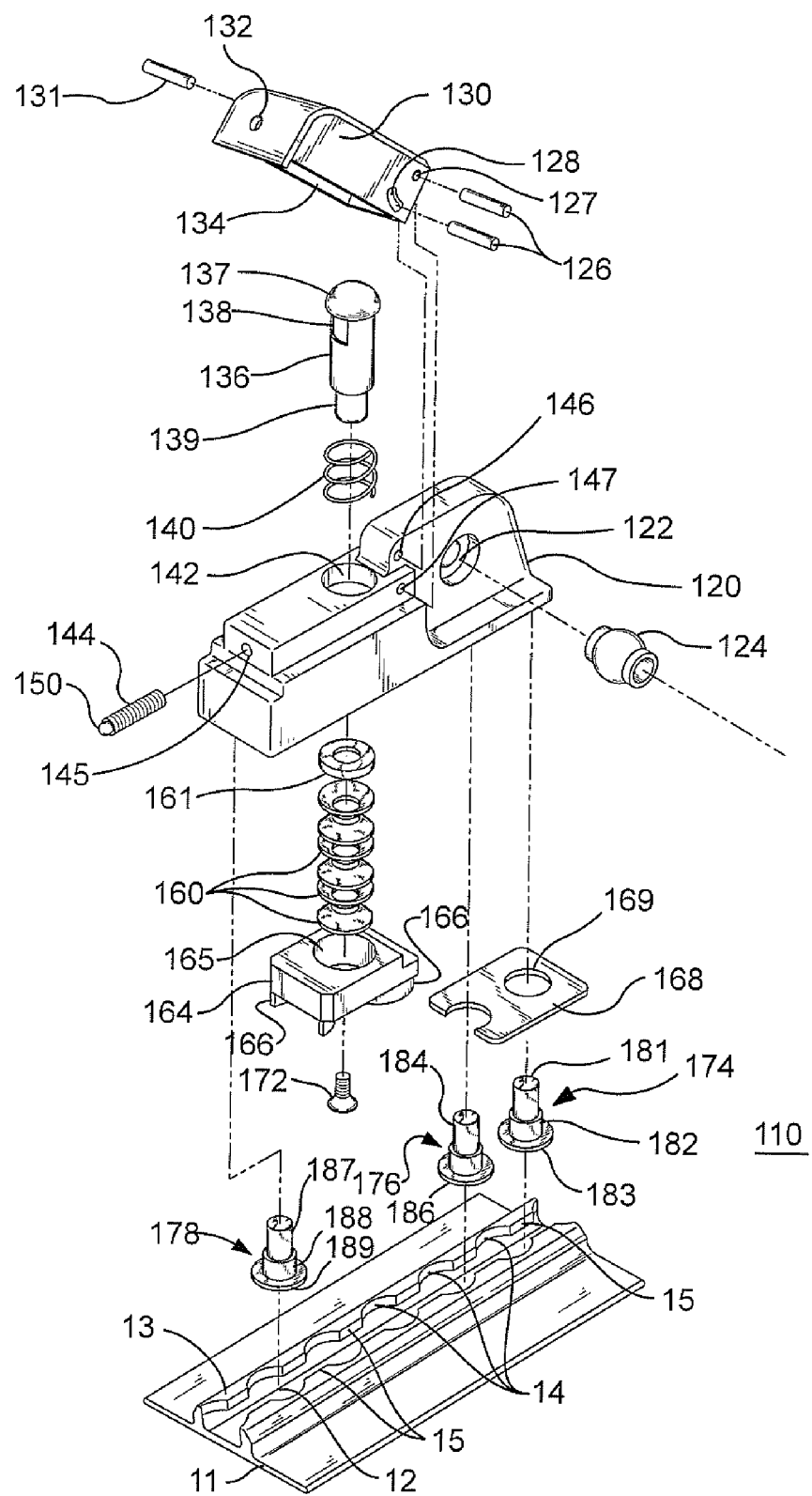
FIG. 13 is a perspective view of the track fastener and adjacent length of the locking track in an exploded view.

A tool-less track fastener assembly 110 according to another embodiment is shown in an exploded view in FIG. 13. The tool-less track fastener assembly 110 includes a main body 120 that defines an opening 122 for receiving a spherical bushing 124. The spherical bushing 124 fits within opening 122 so that it is configured for rotational movement within opening 122. The spherical bushing 124 is configured to receive a fastener for securing the track fastener assembly 110 onto the seat leg "L" as shown in FIG. 1. A locking bracket 130 is rotatably coupled to the main body 120 by a pair of dowel pins 126 that are provided for cooperative insertion into opening 127 and radial slot 128 of the locking bracket 130. A corresponding dowel pin 131 is provided on the adjacent side of the locking bracket 130. The opening 127 and radial slot 128 are generally aligned in cooperation with openings 146 and 147, respectively, of the main body 120. A recess 134 is defined within the locking bracket 130 and is configured for housing push rod 136. Push rod 136 has a rounded head 137 positioned at a top end and a wrench flat portion 138 formed below the rounded head 137. The rounded head 137 provides a generally reduced friction and reduced interference contact with the recess 134 of the locking bracket 130. In this manner, rotational movement of the locking bracket 130 imparts a generally linear vertical movement of the push rod 136 in and out of an opening 142 defined in the main body 120 and towards track 11. The push rod 136 also includes a reduced area portion 139 that will be discussed in subsequent portions of the specification.

Figure 22:
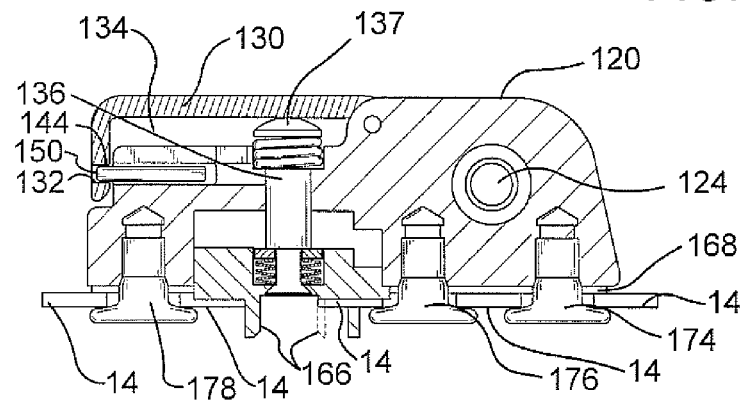
FIG. 22 is a side view of the track fastener and adjacent length of the locking track in the locked position.

A biasing spring 140 biases the push rod 136 in a generally upwards vertical direction away from track 11. The locking bracket 130 defines an opening 132 that receives a protruding head 150 of the plunger 144, thereby securing the locking bracket 130 in place when in the locked position as shown in greater detail in FIG. 22.

The tool-less track fastener assembly includes a plurality of track studs 174, 176, and 178, with each stud having a shank 181, 184, and 187, respectively, a engaging foot 183, 186, and 189, respectively, and a tapered portion 182, 185, and 188, respectively. These track studs 174, 176, and 178 are provided to restrict movement in the vertical direction relative to the track 11. Engaging foot 183, 186, and 189 have a size that it slightly smaller than the size of each access opening 14.

Figure 16A:
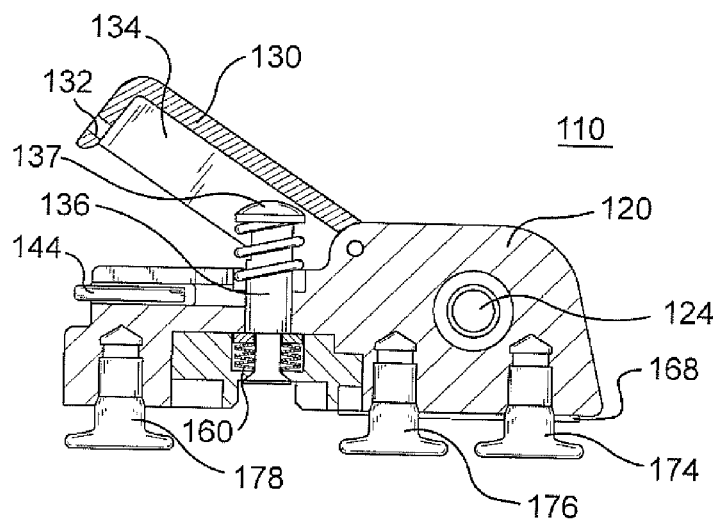
FIG. 16a is a side view of the track fastener, showing the track fastener in an unlocked position.
Figure 16B:
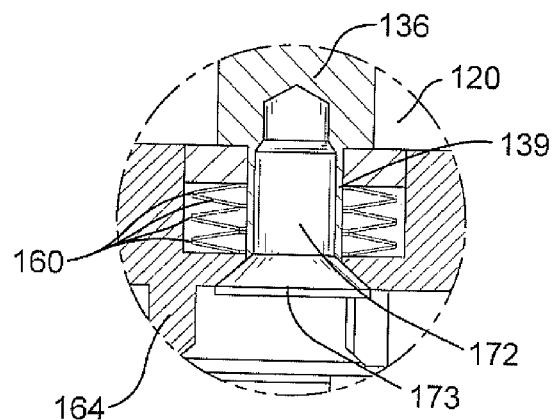
Figure 17:
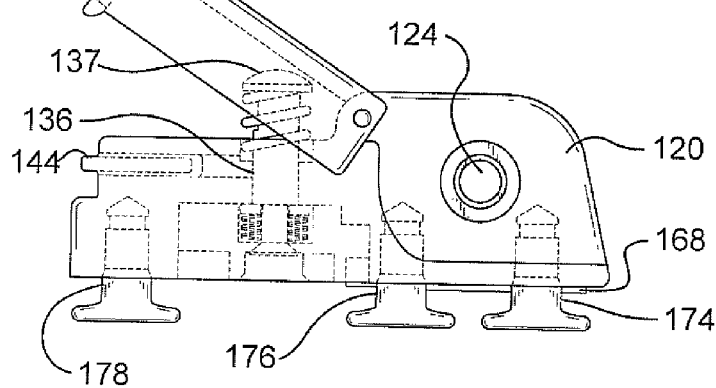
FIG. 17 is a side view of the track fastener, showing a locking bracket of the track fastener moving from the unlocked position to the locked position.
Figure 18:
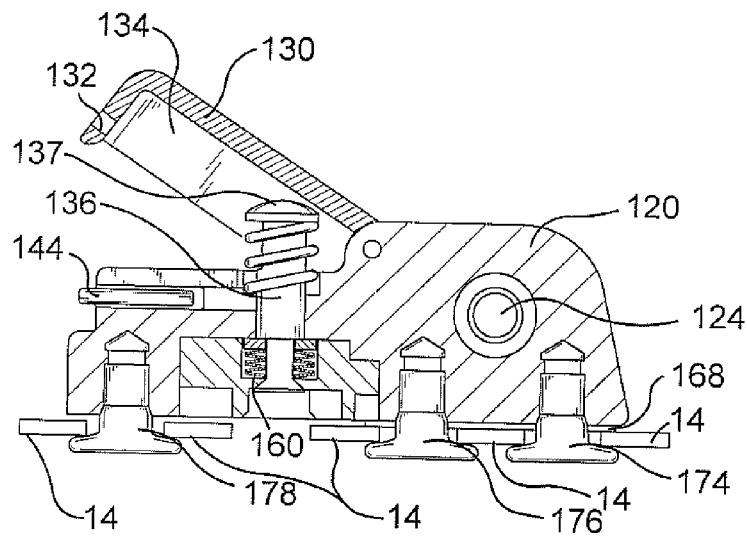
FIG. 18 is a side view of the track fastener and adjacent length of the locking track, showing the track fastener in the unlocked position.
Figure 19:
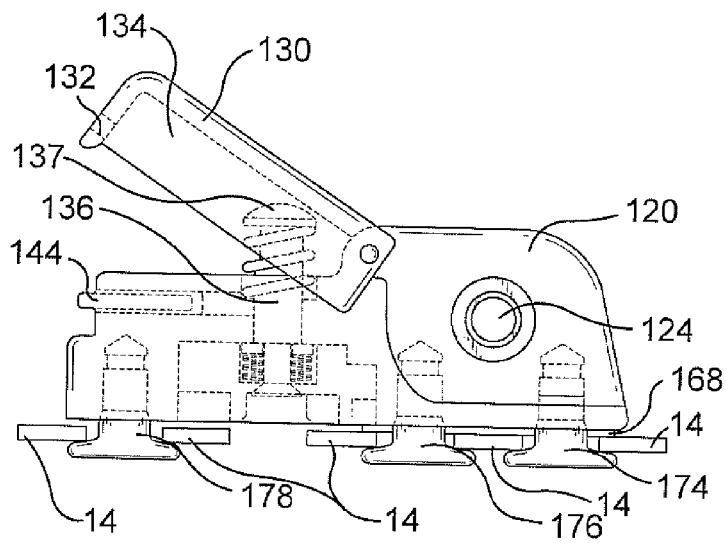
FIG. 19 is a side view of the track fastener and adjacent length of the locking track, showing a locking bracket of the track fastener moving sequentially as compared to FIG. 18 from the unlocked position to the locked position.
Figure 20:
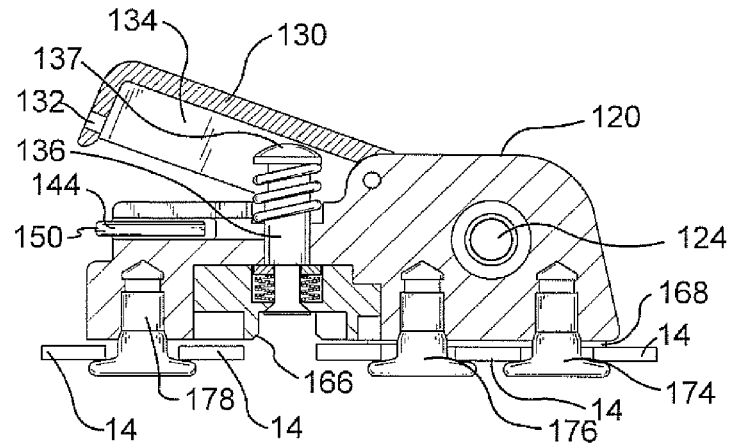
FIG. 20 is a side view of the track fastener and adjacent length of the locking track, showing a locking bracket of the track fastener moving sequentially as compared to FIG. 19 from the unlocked position to the locked position.
Figure 21:
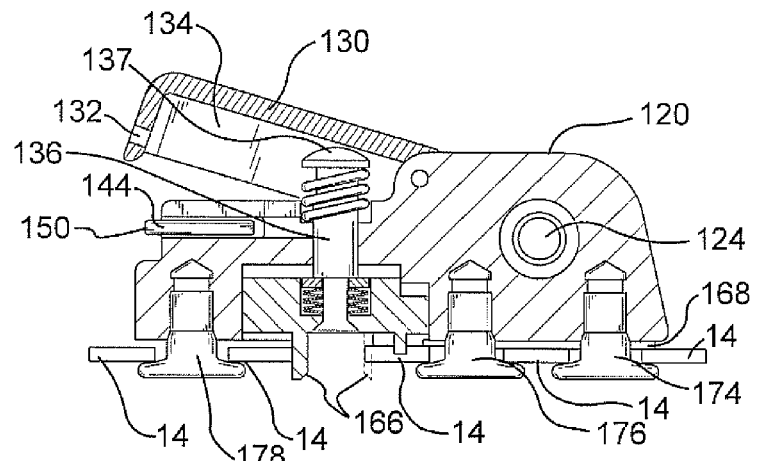
FIG. 21 is a side view of the track fastener and adjacent length of the locking track, showing a locking bracket of the track fastener moving sequentially as compared to FIG. 20 from the unlocked position to the locked position.

A lock disk 164 defines an opening 165 that receives a plurality of spring washers 160 and a collar 161. The spring washers 160 may be conical, belleville, crescent, dome, wave, single wave, or any other appropriate type of spring washer. The spring washers 160 are provided in an alternating arrangement such that they collectively form a spring like structure. The lock disk 160 is configured for vertical movement upon having a force imparted thereon from push rod 136. As shown in FIG. 16B, push rod 136 slides within opening 142 formed within main body 120. The reduced area portion 139 includes a threaded recess whereby fastener 172 is threadable therein. Fastener 172 has a beveled countersunk surface 173 that is configured to mechanically engage lock disk 164, thereby placing lock disk 164 and push rod 136 in linear engagement with one another. The lock disk 160 is in mechanical engagement with recess on the bottom of main body 120. A track fitting pad 168 is adhesively mounted to the bottom of main body 120 to prevent metal to metal contact of main body 120 to upper walls 13 of track 11. Shoulders 166 are provided on adjacent ends of lock disk 164 and are configured to engage about arcuate portions of access openings 14.

As shown in FIG. 16B, push rod 136 slides within opening 142 formed within main body 120. Reduced area portion 139 includes a threaded recess whereby fastener 172 is threadable therein. Fastener 172 has a flange 173 that is configured to mechanically contact lock disk 164, thereby placing lock disk 164 and push rod 136 in linear engagement with one another.

Figure 14A:
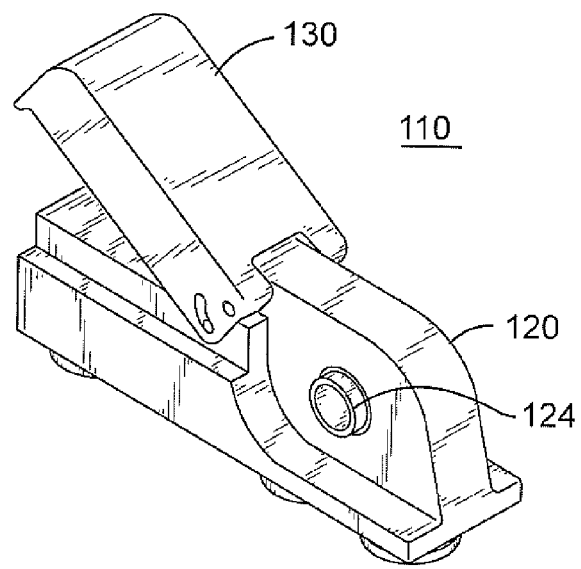
FIGS. 14a and 14b are perspective views of the track fastener, showing the track fastener in an unlocked position.
Figure 14B:
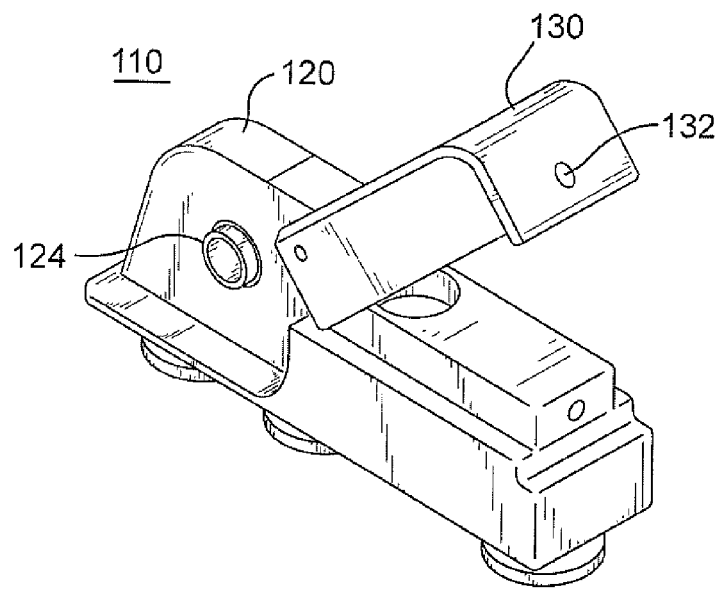
Figure 15A:
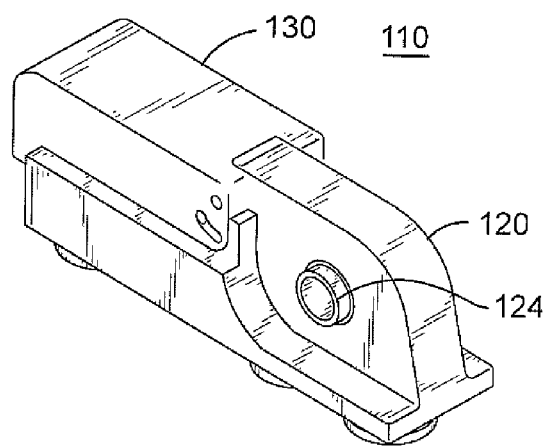
FIGS. 15a and 15b are perspective views of the track fastener, showing the track fastener in a locked position.
Figure 15B:
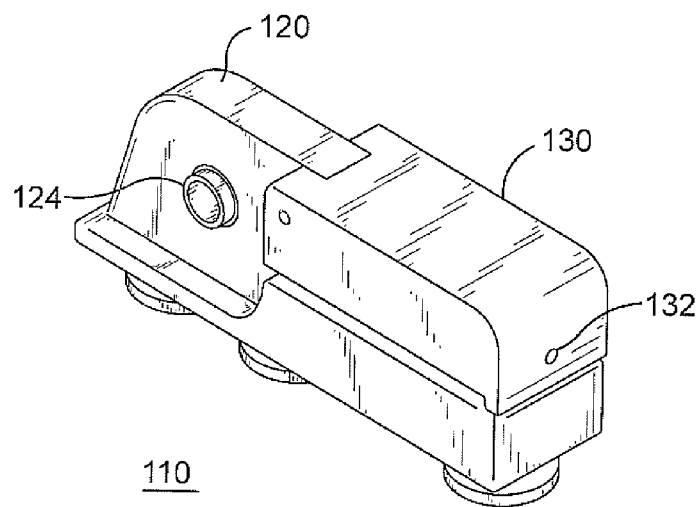

The track fastener assembly 110 is shown in the unlocked position in FIGS. 14A and 14B, and the locked position in FIGS. 15A and 15B, wherein locking bracket 130 is rotated so as to be in contact with main body 120. Operation of the track fastener assembly 110 is shown in FIGS. 17 through 22. Each successive Figure represents a further successive rotation of locking bracket 130 from the unlocked position to the locked position. First, the track fastener assembly 110 is positioned in proximity to track 11, and engaging feet 183, 186, and 189 of each track stud 174, 176, and 178, respectively, are slid into access openings 14. The track fastener assembly 110 is then slid fore or aft so that the engaging feet 183, 186, and 189 are within the narrow retaining slot 15 to thereby restrict upwards movement of the track fastener assembly 110.

With each incremental rotation of locking bracket 130 towards the body main 120, push rod 136 travels further downward. As push rod 136 travels downward, downward movement is imparted to lock disk 164. As the lock disk 164 travels downward, shoulders 166 travel into and engage the portion of the track 11 formed at the intersection of openings 14 and slot segments 15. This will operate to restrict lateral movement of the track assembly 110 about the track 11. Continuing downward movement of the lock disk 164 against openings 14 provides a generally tight and secured fit against openings 14 of track 11. When in the locked position, protruding head 150 of the plunger 144 snaps into recess 132 of the locking bracket 130. This secures the bracket 130 tight against body 120 and places track fastener assembly 110 in the locked position. Removal of the track fastener assembly 110 is accomplished by retracting plunger 144, thus causing protruding head 150 to no longer interfere with opening 132 and then rotate bracket 130 away from the main body 120, thereby lifting the lock disk 164 away from the track and placing the track fastener assembly 110 in the unlocked position.

Figure 23:
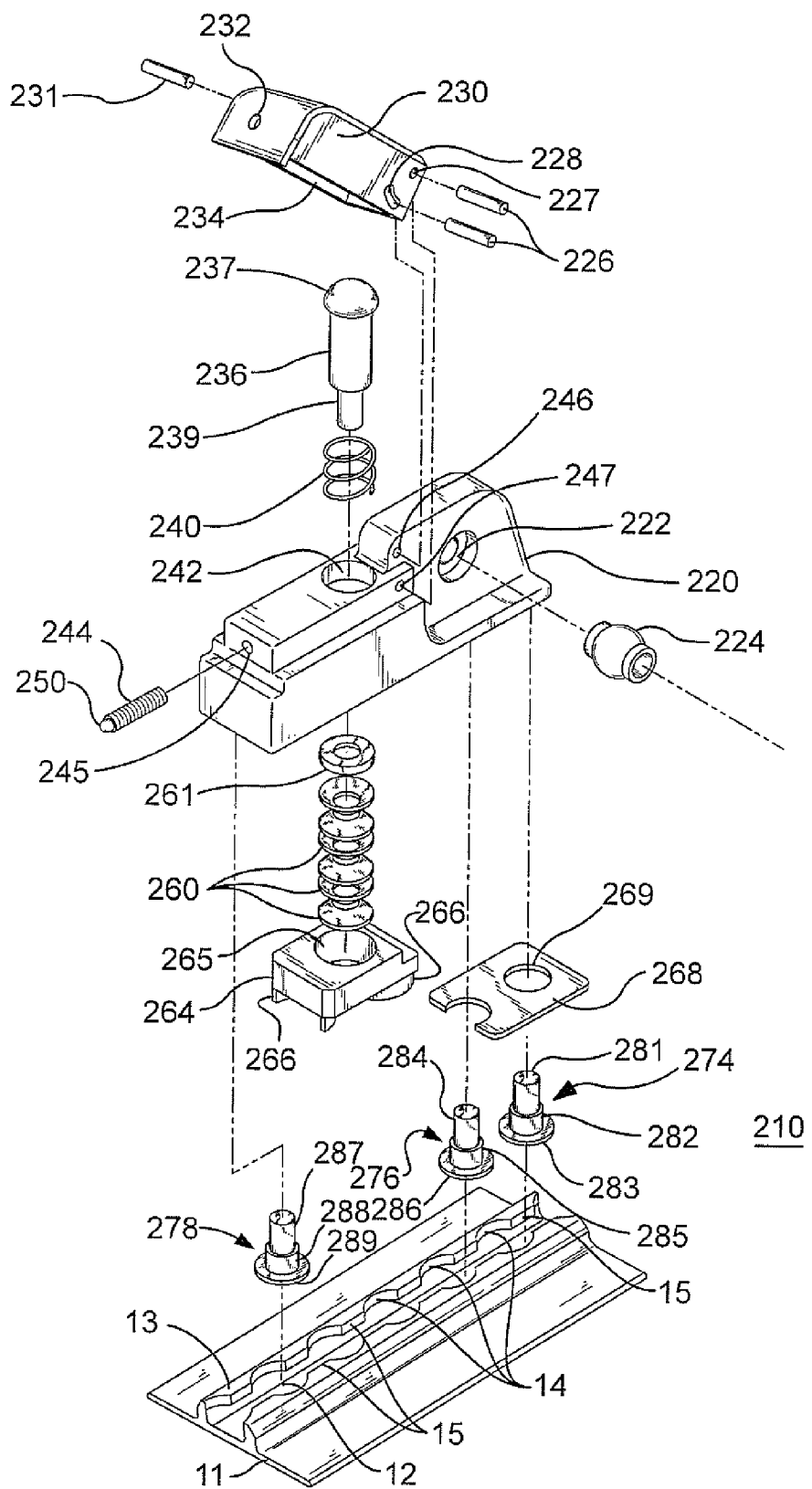
FIG. 23 is a perspective view of the track fastener according to another embodiment of the invention.

An alternative embodiment of the tool-less track fastener assembly is shown in an exploded view in FIG. 23, and is represented as 210. This tool-less track fastener assembly 210 includes many of the same elements as discussed in regards to the tool-less track fastener assembly 110 shown in FIGS. 13 through 22, and corresponding elements are numbered with a number representing 100 more than the like referenced element shown in tool-less track fastener assembly 110. The tool-less track fastener assembly 210 includes a main body 220 that defines an opening 222 for receiving a spherical bushing 224. The spherical bushing 224 fits within opening 222 so that the spherical bushing 224 is configured for rotational movement within opening 222. The spherical bushing 224 is configured to receive a fastener for securing the track fastener assembly 210 onto the seat leg L as shown in FIG. 1. A locking bracket 230 is rotatably coupled to the main body 220 by a pair of dowel pins 226 that are provided for cooperative insertion into opening 227 and radial slot 228 of the locking bracket 230. A corresponding dowel pin 231 is provided on the adjacent side of the locking bracket 230. The opening 227 and radial slot 228 are generally aligned in cooperation with openings 246 and 247, respectively, of the main body 220. A recess 234 is defined within the locking bracket 230 and is configured for housing push rod 236. Push rod 236 has a rounded head 237 positioned at a top end and a detent portion 238 formed below the rounded head 237. The rounded head 237 provides a generally reduced friction and reduced interference contact with the recess 234 of the locking bracket 230. In this manner, rotational movement of the locking bracket 230 imparts a generally linear vertical movement of the push rod 236 in and out of an opening 242 defined in the main body 220. The push rod 236 also includes a reduced area portion 239 that will be discussed in subsequent portions of the specification.

Figure 24A:
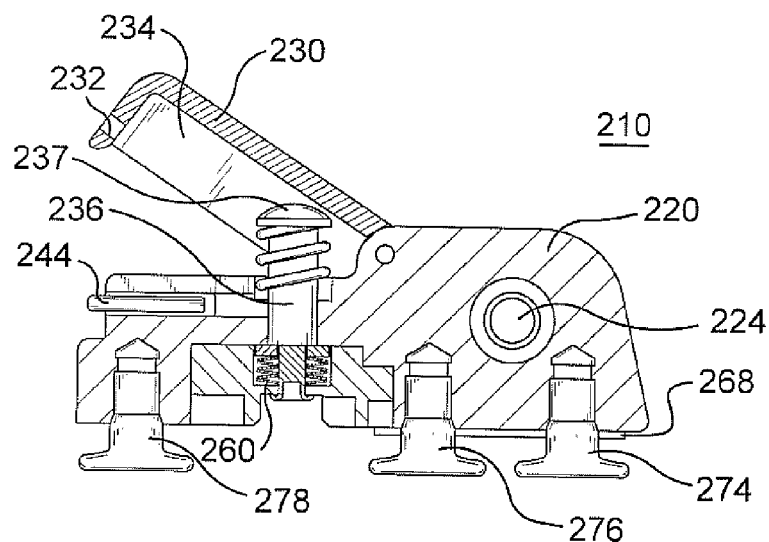
FIG. 24a is a side view of the track fastener according to the embodiment shown in FIG. 12, showing the track fastener in an unlocked position.
Figure 24B:
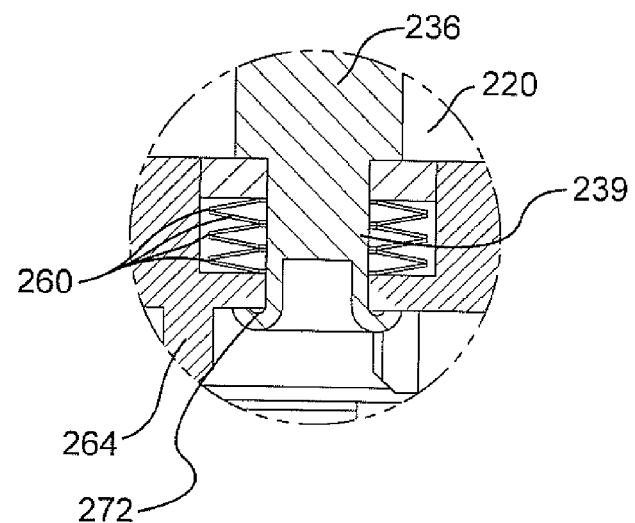

A biasing spring 240 biases the push rod 236 in a generally upwards vertical direction. The locking bracket 230 defines an opening 232 that receives a protruding head 250 of the plunger 244, thereby securing the locking bracket 230 in place when in the locked position A lock disk 264 defines an opening 265 that receives a plurality of spring washers 260 and a collar 261. The spring washers 260 may be conical, belleville, crescent, dome, wave, single wave, or any other appropriate type of spring washer. The spring washers 260 are provided in an alternating arrangement such that they collectively form a spring like structure. The lock disk 260 is configured for vertical movement upon having a force imparted thereon from push rod 236. As shown in FIG. 24B, push rod 236 slides within opening 242 formed within main body 220. The reduced area portion 239 is peenable to define a peened "mushroomed" surface 272 such that surface 272 mechanically engages lock disk 264, thereby placing lock disk 264 and push rod 236 in linear engagement with one another. The lock disk 260 is in mechanical engagement with recess on the bottom of main body 220 such that movement of the lock disk 260 imparts movement to the lock disk 264. A track fastener pad 268 is adhesively mounted to the bottom of main body 220 to prevent metal to metal contact of main body 220 to upper walls 13 of track 11.

This peened "mushroomed" surface 272 is the significant difference between the embodiment shown in FIGS. 13 through 22. The peened "mushroomed" surface 272 provides a more cost efficient alternative to the threadable fastener 272 shown in FIGS. 13 through 2. Locking and unlocking of the tool-less track fastener assembly 210 is accomplished by the same operation as described in detail with regards to FIGS. 13 through 22. The tool-less track fastener assembly 210 interacts with locking track 11 through 22. The tool-less track fastener assembly 210 interacts with locking track 11 similarly as described in regards to embodiment shown in FIGS. 13 through 22.

The tool-less track fastening assembly 10, 110, or 210 is preferably fabricated using computer controlled machining processes to machine metal into a preferred shape approximating the tool-less track fastener. The tool-less track fastener assembly 10 is preferably for aircraft use and must employ the highest aircraft grade metals and machining processes.

An improved aircraft passenger seat tool-less track fastener assembly is described above. Various details of the invention may be changed without departing from the scope of the invention. Furthermore, the foregoing description of the preferred embodiment of the invention and best mode for practicing the invention are provided for the purpose of illustration only and not for the purpose of limitation, the invention being defined by the claims.

I claim:

1. A tool-less track fastener for anchoring an aircraft seat to a track having spaced-apart access openings and a retaining slot interconnecting the spaced-apart access openings, comprising:
    (a) a main body for attaching to a leg of an aircraft seat;
    (b) a lock disk positioned within the main body and movable relative thereto and configured to engage within and spanning adjacent ones of the spaced-apart access openings;
    (c) a push rod positioned at least partially within the main body and adapted to impart movement of the lock disk;
    (d) a locking bracket carried by the main body and in engagement with the push rod and moveable between a first position in which the lock disk is free of interference with the selected one of the spaced-apart access openings and a second position in which the push rod imparts movement of the lock disk into engagement with the selected one of the spaced-apart access openings; and (e) a plurality of fixed track studs extending from the main body in the direction of the track, wherein the plurality of track studs engage an underside of the track when the locking bracket is in the second position such that the track is compressed between the lock disk and the plurality of track studs to prevent vertical and horizontal movement of the main body with respect to the track.

2. The track fastener according to claim 1, further including a pad positioned on a bottom surface of the main body.

3. The track fastener according to claim 1, further including a biasing spring positioned on a reduced circumference area of the push rod for biasing the push rod away from the lock disk.

4. The track fastener according to claim 1, wherein the lock disk comprises at least one shoulder formed on opposing ends of the lock disk, and the at least one shoulder has a generally arcuate cross section that conforms to the shape of a portion of an access opening.

5. The track fastener according to claim 1, wherein the main body defines an opening that receives a spherical bushing, and the spherical bushing receives a fastener therethrough for fastening the main body to an aircraft seat.

6. The track fastener according to claim 1, wherein the locking bracket defines a cavity therein that receives the push rod.

7. The track fastener according to claim 1, wherein the push rod is attached to the lock disk by a selectively releasable fastener.

8. The track fastener according to claim 1, wherein the push rod is attached to the lock disk by peening a surface of the push rod into engagement with the lock disk.

9. An aircraft seat including a plurality of legs, each of the plurality of legs terminating in a tool-less track fastener for being attached to a track having spaced-apart access openings and a retaining slot interconnecting the spaced-apart access openings, the tool-less track fastener of each of the plurality of legs comprising:

(a) a main body for attaching to a leg of an aircraft seat;

(b) a lock disk positioned in within the main body and movable thereto and having at least one locking shoulder configured to engage within and spanning adjacent ones of the spaced-apart access openings;

(c) a push rod positioned at least partially within the main body and in proximity to the lock disk for imparting movement to the lock disk;

(d) a locking bracket carried by the main body and in selective engagement with the push rod and moveable between a first position in which the shoulders of the lock disk are free of interference with the selected one of the spaced-apart access openings and a second position in which the push rod imparts movement to the lock disk until the shoulders of the lock disk engage the selected one of the spaced-apart access openings; and (e) a plurality of fixed track studs extending from the main body in the direction of the track, wherein the plurality of track studs engage an underside of the track when the locking bracket is in the second position such that the track is compressed between the lock disk and the plurality of track studs to prevent vertical and horizontal movement of the main body with respect to the track.

10. The seat according to claim 9, further including a pad positioned on a bottom surface of the main body.

11. The seat according to claim 9, further including a biasing spring positioned on a reduced circumference area of the push rod for biasing the push rod away from the lock disk.

12. The seat according to claim 9, wherein the lock disk comprises at least one shoulder formed on opposing ends of the lock disk, and the at least one shoulder has a generally arcuate cross section that conforms to the shape of a portion of an access opening.

13. The seat according to claim 9, wherein the main body defines an opening that receives a spherical bushing, and the spherical bushing receives a fastener therethrough for fastening the main body to the aircraft seat.

14. The seat according to claim 9, wherein the locking bracket defines a cavity therein that receives the push rod.

* * * * *